Patented Feb. 19, 1929.

1,702,250

UNITED STATES PATENT OFFICE.

CLARENCE LEON DELACHAUX, OF GENNEVILLIERS, FRANCE.

IRON OXIDES AND THEIR PRODUCTION.

No Drawing. Application filed February 16, 1926, Serial No. 88,686, and in France July 29, 1925.

My invention relates to iron oxides richer in oxygen than the ferrosoferric oxide $Fe_3O_4$, the proportion of oxygen in said oxides being intermediary between the proportions of oxygen in said ferrosoferric oxide and in ferric oxide $Fe_2O_3$ and, if desired, very near latter proportion. My invention has also for object a method for producing commercially these oxides and the application thereof to aluminothermic processes.

The abovementioned oxides are mixtures, solid solutions or combinations of ferrous oxide FeO, of ferric oxide $Fe_2O_3$ and of ferrosoferric oxide $Fe_3O_4$. Their characteristic feature is the fact that the ratio between the estimated ferrous iron and ferric iron is smaller than ½ or, otherwise stated, if no account is made of impurities such as silicon, manganese, etc. that the oxide contains less than 31,03% of ferrous oxide FeO.

The application of these products to aluminothermic processes is of advantage in that the reactions are more regular and the heat is greater with said products than with the ferrosoferric oxide $Fe_3O_4$ normally used.

Thus if an aluminothermic mixture is prepared with the exact amount of aluminium required, and ferrosoferric oxide, the reaction will give out about 1476 calories for each kilogramme of iron produced that is 3420 for each kilogramme of aluminium used whereas if $Fe_3O_4$ is replaced by an oxide richer in oxygen the reaction will produce nearly 1735 calories for each kilogramme of iron or 3530 calories for each kilogramme of aluminium, these figures corresponding to the use of pure ferric oxide $Fe_2O_3$.

According to my invention these oxides are produced by treating forge and mill scale which appears like chaff beaten out of iron during forging and rolling. This scale is a mixture or a combination of iron oxides which are less oxygenated than $Fe_3O_4$ and contain often free iron as well as impurities. The scale is first roasted. The water and organic matter are removed first together with the sulphur which may be included in the scale. Afterwards if the atmosphere of the furnace is sufficiently oxidizing, the substance changes and is gradually oxidized, the proportion of oxygen rising from that corresponding to the untreated scale to that corresponding to ferric oxide $Fe_2O_3$. The operation is stopped when the desired proportion in oxygen (or in FeO) is reached. The success of the operation depends on the atmosphere of the furnace and on the manner of changing the contact surfaces between the oxide and the gases.

My experiments show that in practice the operation should take place between 800 and 1100° C. After latter temperature the oxide begins to be dissociated and the proportion of oxygen diminishes. As to the atmosphere of the furnace it should contain at least 2% of free oxygen; there is no highest limit prescribed to the amount of oxygen.

Moreover the contact surface between the oxide and the gases should be frequently changed. It is therefore of advantage to use a continuous or a rotating furnace or a mechanically stirred furnace or again a furnace with a revolving hearth. If a proper stirring is provided, if the proportion of oxygen in the gases is about 7% and the temperature is kept at about 900° C., twenty minutes will be easily sufficient for producing an oxide containing less than 0,6% of FeO. In other words the ratio between ferrous and ferric oxides in the product obtained will be less than 0,69%.

The product, after the roasting, can be if desired crushed, sifted or magnetically separated, latter operation having for object the removal of non-magnetic impurities such as silicon and silicates.

What I claim is:

1. A new product comprising iron oxides richer in oxygen than ferrosoferric oxide wherein the ratio between ferrous iron and ferric iron is smaller than ½, that is wherein the proportion of FeO is smaller than 31,03% no account being made of the impurities.

2. As a step in the alumino-thermic process the addition of the product described in claim 1 to aluminum in lieu of ferrosoferric oxide.

3. Production of the oxides claimed in claim 1 consisting in oxidizing forge and mill scale in a roasting furnace whilst the contact surfaces between the product and the gases are constantly changed.

4. Production of the oxides claimed in claim 1 consisting in oxidizing forge and mill scale in a roasting furnace whilst the contact surfaces between the product and the gases are constantly changed and subsequently crushing and sifting the product.

5. Production of the oxides claimed in claim 1 consisting in oxidizing forge and mill scale in a roasting furnace whilst the contact surfaces between the product and the gases are constantly changed and subsequently magnetically removing the non-magnetic impurities from the product.

In witness whereof I have hereunto set my hand.

CLARENCE LEON DELACHAUX.